United States Patent Office 3,228,981
Patented Jan. 11, 1966

3,228,981
SF₅ CONTAINING AZOMETHINES AND
THEIR PREPARATION
Charles W. Tullock, Wilmington, Del., assignor to E. I.
du Pont de Nemours and Company, Wilmington, Del.,
a corporation of Delaware
No Drawing. Filed June 27, 1962, Ser. No. 205,562
17 Claims. (Cl. 260—543)

This invention relates to, and has as its principal objects provision of, novel compositions of matter and the preparation of the same.

The principal compositions of this invention are defined by the general formula SF₅—N=CXX′, in which X is halogen of atomic number 9 through 17 and X′ is a number of the group consisting of halogen of atomic number 9 through 17, hydrogen-free polyfluoroalkyl of up to 19 carbon atoms (preferably perfluoro- or chloroperfluoroalkyl), aryl, chloroaryl, and nitroaryl of up to 14 carbon atoms,

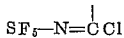

and

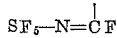

The compounds of the above formula wherein X is chlorine and X′ is either chlorine, polyfluoroalkyl, aryl, chloroaryl, nitroaryl, or

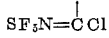

are made by subjecting a mixture of SF₅Cl and either cyanogen, cyanogen chloride, or a carbonitrile free of aliphatic, i.e., nonaromatic, hydrogen, and aliphatic carbon-carbon unsaturation to the action of ultraviolet light.

The compound of the above general formula wherein X and X′ are both fluorine is made by reacting SF₅N=CCl₂ with an alkali metal fluoride. The compounds in which X is fluorine and X′ is polyfluoroalkyl, i.e., R_f, are made by reacting SF₅N=CClR_f with either hydrogen fluoride or an alkali metal fluoride. SF₅=CCl₂ also reacts with hydrogen fluoride but yields the saturated product, SF₅NHCF₃.

The compound of the above formula in which X is fluorine and X′ is

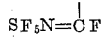

is synthesized by treating with sodium fluoride the product obtained from the reaction of SF₅Cl with cyanogen, i.e.,

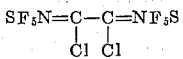

as described below in Example IV.

In the process employing ultraviolet light, a mixture of SF₅Cl and either cyanogen, cyanogen chloride or carbonitrile is placed in a reactor, illuminated with ultraviolet light, e.g., from a mercury vapor lamp, and the product is recovered either as condensate on the bottom of the reactor or, if volatile enough, by transfer from the reactor to a cold evacuated receiver.

Nitriles useful in this process are cyanogen, cyanogen chloride, and carbonitriles of the formula ACN, in which A is polyfluoroalkyl radical of up to 19 carbon atoms free of aliphatic hydrogen, and preferably either perfluoro- or chloroperfluoroalkyl, or aryl, chloroaryl, or nitroaryl of up to 14 carbon atoms. Usable specific carbonitriles include perfluoropropionitrile, perfluorobutyronitrile, perfluoroisobutyronitrile, perfluorocapronitrile, perfluorostearonitrile, 5-chlorodecarfluoropentanonitrile, 8-chlorotetradecafluoroctanonitrile, perfluorocaprylonitrile, benzonitrile, chlorobenzonitrile, nitrobenzonitrile, and the like.

The reaction between SF₅Cl and carbonitrile is an addition generally involving one mole of each reactant and may be represented by the following equation:

$$SF_5Cl + ACN \rightarrow SF_5N=CClA$$

in which A has the previously indicated meaning. Because of the dimeric nature of cyanogen, its similar reaction with SF₅Cl requires two moles of the latter compound in accord with the equation:

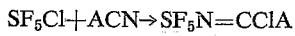

As the term is used herein, "ultraviolet light" refers to light of wave lengths in the range of 1800 to 4000 A. As a suitable ultraviolet light source there can be used any of the commercially available lamps which are high in ultraviolet light output. Generally speaking, mercury vapor lamps are preferred because they provide a relatively intense source of ultraviolet light. Many lamps of this type are available and include low and high pressure lamps with various types of envelopes. The most preferred types are those with quartz envelopes because such envelopes permit higher transmission of ultraviolet light.

In practice, it is desirable that the light source be as close to the mixture of SF₅Cl and other reactant as possible. This can be accomplished by placing the lamp immediately adjacent a transparent wall of the reaction vessel or in a well projecting into the reaction space, or by passing the mixture of reactants through a tube which is exposed to ultraviolet light.

The irradiation is carried out for periods of time which can be as short as 15 minutes or can extend to several days, depending upon the size of the sample being irradiated, the efficiency of the light source, and the nature of the reactants.

The reaction between SF₅Cl and either cyanogen, cyanogen chloride, or carbonitrile can be carried out in the gas or liquid phase at temperatures which can be up to 100° C., but most generally are between −20° C. and 50° C. Pressures employed are usually autogenous as with all reactions of this invention. Externally applied pressure can be used, however, but leads to no practical advantage.

The reaction between the SF₅Cl and either cyanogen, cyanogen chloride, or carbonitrile can be carried out in the presence of an inert, normally liquid reaction medium. By inert reaction medium is meant a medium which is unreactive, under the conditions of reaction, with the reactants or reaction products.

When a reaction medium is used, it can equal or exceed the weight of the reactants by many fold. If the carbonitrile is normally liquid under the conditions of reaction, it can be used as a reaction medium and the excess removed after reaction is complete. Suitable reaction media are carbon tetrachloride, dichlorodifluoromethane trichlorofluoromethane, 1,1,2-trichloro-1,2,2-trifluoroethane, and the like.

The reaction between SF₅N=CClR_f or SF₅N=CCl₂ and HF is not catalyzed by ultraviolet light and involves reacting one mole of the pentafluoro compound with two or three moles of HF, in accord with the equations:

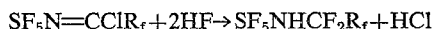

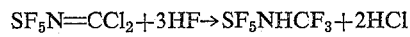

These reactions usually are carried out at temperatures ranging from 25° to 150° C. and autogenous pressure for convenience, but reactions will proceed in some cases at atmospheric pressures using liquid hydrogen fluoride at 0° to +19° C. as a reaction medium.

The reaction between SF₅N=CCl₂, SF₅N=CClR_f, SF₅N=CCl—CCl=NSF₅ and alkali metal fluoride requires thermal activation and involves one mole of the $SF_5N=CClR_f$, $SF_5N=CCl_2$, or $$SF_5N=C-C=NF_5S$$
$$\phantom{SF_5N=}|\phantom{-C}|$$
$$\phantom{SF_5N=}Cl\phantom{-}Cl$$

and one or two moles of the alkali metal fluoride, in accord with the equations:

$$SF_5N=CClR_f+MF \xrightarrow{\Delta°} SF_5N=CFR_f+MCl$$

$$SF_5N=CCl_2+2MF \xrightarrow{\Delta°} SF_5N=CF_2+2MCl$$

$$SF_5N=C-C=NF_5S+2MF \longrightarrow SF_5N=C-C=NF_5S+2MCl$$
$$\phantom{SF_5N=}|\phantom{-C}|\phantom{XXXXXXXXXXXXXX}|\phantom{-C}|$$
$$\phantom{SF_5N=}Cl\phantom{-}Cl\phantom{XXXXXXXXXXXXXXXX}F\phantom{-}F$$

The alkali metal fluorides usable are sodium, potassium, rubidium, and cesium fluorides. Of these sodium fluoride is preferred because of its availability, reactivity, and low cost.

In a convenient way for effecting the reaction, the alkali metal fluoride is suspended in a suitable reaction medium, for example, tetramethylene sulfone and the $SF_5N=CCl_2$, $SF_5N=CClR_f$, or $SF_5N=CCl-CCl=NF_5S$ compound is added to the suspension at ambient temperature. The reaction mixture is then heated rapidly up to about 50° C. and held between this temperature and 200° C., usually between 60° and 180° C., for from 30 minutes to two hours. The product, if volatile, is collected in a trap cooled in an acetone solid-carbon dioxide bath and the condensate is subjected to fractional distillation to isolate the desired product. Another procedure involves removal of the metal chloride and unreacted metal fluoride by filtration, followed by distillation.

The products of this invention, e.g., $SF_5N=CCl_2$, $SF_5N=CClR_f$, and $SF_5N=CFR_f$, are useful as solvents for low molecular weight polytetrafluoroethylenes. Fabrics or paper which have been dipped into solutions in these solvents, the solvents then removed by evaporation, have a thin coating of polytetrafluoroethylene, which imparts thereto water repellency or, in some cases, improved resistance to flames. Polyamide resins in contact with these materials swell and on moderate warming become soft enough to be molded readily. High molecular weight polyoxymethylenes of the type disclosed and claimed in U.S. Pat. No. 2,768,994, dissolve in $SF_5NHCF_3$ and $SF_5NHR_f$ derivatives at room temperature, while polyamides are softened sufficiently so that they can be shaped into desired forms. The substituted amine, $$SF_5-N---N-SF_5$$
$$\phantom{SF_5-}|\phantom{XXX}|$$
$$\phantom{SF_5-}CF_3\phantom{X}CF_3$$

also is an excellent solvent for very low molecular weight polytetrafluoroethylene at room temperature. The gaseous product, $SF_5N=CF_2$, is useful as a fumigant for roaches, flies, etc.

There follow some examples submitted to illustrate but not to limit the invention. In these examples the nuclear magnetic resonance, n-m-r, data were obtained using a high resolution spectrometer and associated electromagnet, both manufactured by Varian Associates, operating usually at 56.4 mc./sec. but sometimes at 40 mc./sec. and approximately 14,000 gauss. Quantitative analyses based on infrared or n-m-r are expressed as mole percentages.

*Example I*

$$SF_5Cl + ClCN \xrightarrow{UV} SF_5N=CCl_2$$

A 12-liter round bottom flask containing 14 g. of cyanogen chloride and 37 g. of sulfur chloride pentafluoride, $SF_5Cl$, was irradiated for 6.5 hours at ambient temperature. The contents of the flask were then removed and allowed to warm gradually to attain ambient temperature. The liquid distilling above room temperature from this experiment and that from a second one in which 14 g. of cyanogen chloride and 33 g. of $SF_5Cl$ were irradiated for eight hours were composited to give 37 g. of product. This corresponded to a 38% conversion, based on $SF_5Cl$, of colorless $SF_5N=CCl_2$ (dichloromethyleneamino) sulfur pentafluoride, B.P. 86–88° C. The foreshot, B.P. 35–86° C., amounting to 6.4 g. was $SF_5N=CCl_2$ contaminated with a small amount of $S_2F_{10}$. The product, (dichloromethyleneamino)sulfur pentafluoride, $SF_5N=CCl_2$, reacted with 10% sodium hydroxide solution to give a solution containing both chloride and fluoride ions.

*Analysis.*—Calcd. for $CCl_2F_5NS$: Cl, 31.70; F, 42.41; S, 14.28. Found: Cl, 32.37; F, 42.44; S, 13.63.

The $F^{19}$ n-m-r spectrum indicated that an $SF_5$ group was present. The infrared spectrum showed absorption at 6.10 μ (>C=N—) and in the 10.5 to 12.0 μ region ($SF_5$). Mass spectrometric analysis was satisfactory. Peaks corresponding to the parent (223), to $SF_5$ (127), and to $CCl_2$ (82) were found to be present. The alternate structure for this compound, $SF_5CCl=NCl$, was eliminated when hydrogen fluoride was found to convert it to $SF_5NHCF_3$, and sodium fluoride was found to convert it to $SF_5N=CF_2$.

*Example II*

$$SF_5Cl + CF_3CN \xrightarrow{UV} SF_5N=CClCF_3$$

A 22-liter round bottom flask containing 38 g. of trifluoroacetonitrile, $CF_3CN$, and 67 g. of $SF_5Cl$ was irradiated for 14.5 hours at ambient temperature. Distillation of the liquid remaining after removal of unreacted $CF_3CN$ and $SF_5Cl$ yielded 33 g., amounting to a 32% conversion based on $CF_3CN$, of colorless (1-chlorotrifluoroethylideneamino)sulfur pentafluoride, $$SF_5N=CClCF_3,$$

B.P. 58–61° C.

*Analysis.*—Calcd. for $CClF_8NS$: Cl, 13.75; F, 59.03. Found: Cl, 14.34; F, 58.73.

The $F^{19}$ n-m-r spectrum indicated that an $SF_5$ and a $CF_3$ group were present. The infrared spectrum showed absorption at 6.0μ (>C=N—) and in the 11 to 12μ region ($SF_5$). Mass spectrometric analysis showed the presence of peaks corresponding to the parent (257), to the parent minus fluorine (238), to the parent minus chlorine (222), and to the parent minus $CF_3$ (188). From this the indicated structure was deduced to be $$SF_5N=CClCF_3$$

The alternate structure, $SF_5CCF_3=NCl$, was eliminated when it was found that hydrogen fluoride converted the product to $SF_5NHC_2F_5$.

*Example III*

$$SF_5Cl + C_3F_7CN \xrightarrow{UV} SF_5N=CClC_3F_7$$

A 22-liter round bottom flask containing 59 g. of perfluorobutyronitrile and 59 g. of $SF_5Cl$ was irradiated for 17.7 hours at ambient temperature. Distillation of the product yielded 49 g., amounting to a 45% conversion, based on the $C_3F_7CN$ used, of $SF_5N=CClC_3F_7$, (1-chloroheptafluorobutylideneamino)sulfur pentafluoride, B.P. 99–101° C., and 18.4 g. of foreshot, B.P. 32–97.5° C., which contained some $S_2F_{10}$, a large amount of $SF_5N=CClC_3F_7$ and some $SF_5N=CFC_3F_7$ (based on infrared and n-m-r analyses.

*Analysis.*—Calcd. for $C_4ClF_{12}NS$: Cl, 9.93; F, 63.77. Found: Cl, 9.91; F, 62.24.

The $F^{19}$ n-m-r spectrum indicated that an $SF_5$ group and a $C_3F_7$ group were present. The infrared spectrum showed absorption at 5.92μ (>C=N—) and in the 11 to 12μ region ($SF_5$.

*Example IV*

$$2SF_5Cl+(CN)_2 \rightarrow SF_5N=CCl-CCl=NSF_5$$

A 22-liter round bottom flask containing 23 g. of cyanogen and 60 g. of SF₅Cl was irradiated for 22 hours at ambient temperature. Removal of the gases left 25 g. (I) of yellow-colored liquid distilling above 25° C. A second experiment in which 22 g. of cyanogen and 62 g. of SF₅Cl were irradiated for 23 hours yielding 33 g. (II) of crude product distilling above 25° C. The composite of experiments I and II on distillation yielded the following:

| Cut No. | Wt. (g.) | B.P., ° C. | Product |
|---|---|---|---|
| 1 | 10 | 27–29° | S₂F₁₀. |
| 2 | 1.5 | 42–80° | Not analyzed. |
| 3 | 1.4 | 80–85° | SF₅N=CCl₂. |
| 4 | 4.0 | 47–64°/32 mm | SF₅N=C—C=NSF₅(75%) (I). 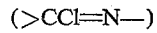 F Cl |
| 5 | 3.4 | 65–66°/28mm | SF₅N=CCl—CCl=NSF₅(25%) (II). I (10%) II (90%). |
| 6 | 3.1 | 66–69°/29 mm | I (10%) II (90%). |
| 7 | 7.5 | 69°/29 mm | I (100%). |

Cut No. 7 was SF₅N=CCl—CCl=NSF₅, N,N'-(dichloroethanediylidene)bis(aminosulfur pentafluoride) (compound II), based on n-m-r analysis which indicated that a single SF₅ group and no other fluorine was present. The infrared spectrum showed absorption at 6.10μ (>C=N—) and in the 11 to 12μ region (SF₅). Mass spectrometric analysis was satisfactory; although the parent peak was not present, peaks corresponding to the parent minus a chlorine (341), and to SF₅N=CCl (188) were present.

*Analysis.*—Calcd. for C₂Cl₂F₁₀N₂S₂: Cl, 18.8; F, 50.4; S, 17.0. Found: Cl, 19.78; F, 49.80; S, 16.47.

The F¹⁹ n-m-r analysis suggested that Cuts Nos. 5 and 6 contained about 90% II and 10% of I, believed to be SF₅N=CClCF=NSF₅. The evidence for the structure of compound I is based on infrared, which showed absorption at 5.85μ (>CF=N—) and at 6.05μ

(>CCl=N—)

and on mass spectrometric analysis, which showed the peak corresponding to the parent minus a chlorine (325) and a peak corresponding to SF₅N=CClCF=N— (233). Cut No. 3 was shown by mass spectrometric analysis to contain 30% SF₅N=CCl₂, the remaining product being probably SF₅N=CClCN, based on peaks corresponding to parent minus fluorine (195), and the parent minus chlorine (179). Infrared analysis also showed absorption at 4.45μ for nitrile.

Unsuccessful attempts were made to isolate pure SF₅N=CClCF=NSF₅ (compound I) by a careful redistillation of those cuts in which it was present in substantial amount. Mixtures of I and II when heated with sodium fluoride suspended in tetramethylenesulfone at temperatures up to 145° C. yielded small amounts (3.7 g.) of product, B.P. 118–120° C. The infrared spectrum of the product showed strong absorption at 5.8μ (satisfactory for (>CF=N—)) and in the 10.7–12μ region (SF₅); F¹⁹ n-m-r spectrum showed the presence of an SF₅ group and a C—F bond. Mass spectrometric analysis appeared satisfactory for SF₅N=CFCF=NSF₅, N,N'-(difluoroethanediylidene)bis(aminosulfur pentafluoride), showing peaks corresponding to the parent (344), to the parent minus three fluorines (287), to

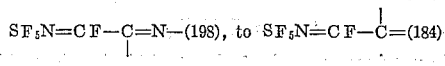
SF₅N=CF—C=N—(198), to SF₅N=CF—C=(184)

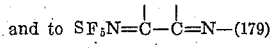
and to SF₅N=C—C=N—(179)

*Analysis.*—Calcd. for C₂F₁₂N₂S₂:F, 66.3; S, 18.6. Found: F, 64.0; S, 18.1.

*Example V*

SF₅Cl+C₆H₅CN→SF₅N=CClC₆H₅

A 230-ml. quartz tube provided with a magnetic stirrer and attached to a solid carbon dioxide-acetone cooled finger was charged with 27 g. of benzonitrile, C₆H₅CN, 10 ml. of 1,1,2-trichloro-1,2,2-trifluoroethane CF₂ClCFCl₂

(added to keep the C₆H₅CN in a liquid state), 45 g. of SF₅Cl, and 7 g. of dichlorodifluoromethane, CF₂Cl₂ (added to prevent the SF₅Cl from solidfying in the cold finger), and the mixture exposed to a mercury resonance lamp for two days. Removal of the CF₂ClCFCl₂ and CF₂Cl₂, and unreacted benzonitrile under reduced pressure (B.P. 21–25°/0.2 mm.) left 1.9 g. of a viscous syrup. The F¹⁹ n-m-r spectrum indicated the presence of an SF₅ group and no other fluorine; the infrared spectrum showed broad absorption at 10.7 to 12.5μ (SF₅) and a probable

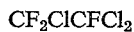
—C=N—
|
Cl 6.2μ band; benzonitrile also was shown to be present. A test portion of the sample on warming with 10% sodium hydroxide solution gave a solution containing chloride ion. Mass spectrometric analysis was fairly satisfactory for SF₅N=CClC₆H₅, (phenylchloromethyleneamino)sulfur pentafluoride, since peaks corresponding to the parent (265) and to the parent minus chlorine (230) were present. In addition, the presence of C₆H₅CN and of ClC₆H₄CN was confirmed. The presence of very small peaks at 391 and 390 provided evidence for the possible presence of SF₅N=CClC₆H₄SF₅.

*Example VI*

SF₅N=CCl₂+2NaF→SF₅N=CF₂+2NaCl

To a suspension of 25 g. of sodium fluoride in 50 ml. of tetramethylene sulfone was added 17.8 g. of SF₅N=CCl₂ at ambient temperature. The mixture was rapidly heated to 75° C. and then at 75–156° C. for 0.75 hour, during which time the volatile products removed were collected in a solid carbon dioxide-acetone cooled trap. The volatile material thus obtained was combined with that from a second experiment using 24 g. of SF₅N=CCl₂. Distillation of the composite yielded 6 g., B.P. 5–9° C. (I), and 12 g., B.P. 9–12.5° C. (II). Mass spectrometric analysis of II was satisfactory for

SF₅N=CF₂

(difluoromethyleneamino)sulfur pentafluoride, with the highest mass being the parent peak (211). The F¹⁹ n-m-r spectrum showed the presence of an SF₅ and a CF₂ group. Infrared analysis showed absorption at 5.58μ (>C=N—), at 7.45μ and 7.60μ (C—F), and in the 11 to 12μ region (SF₅). Infrared analysis also showed that Cut I also was 80–90% SF₅N=CF₂ and 10 to 20% of SF₄=NCF₃, an isomer of SF₅N=CF₂; therefore, the product was obtained in about a 45% conversion.

*Analysis.*—Calcd. for CF₇NS: F, 69.63; S, 16.75. Found: F, 68.50; S, 16.98.

Further evidence that the compound was SF₅N=CF₂ was provided by formation of SF₅NHCF₃ by the reaction with hydrogen fluoride at 80° C. and autogenous pressure.

*Example VII*

SF₅N=CCl₂+NaF→SF₅N=CF₂+2NaCl

To a suspension of 168 g. of sodium fluoride in 500 ml. of tetramethylene sulfone was added 218 g. of SF₅N=CCl₂ at ambient temperature. The mixture was heated to 60° C. in 0.35 hour, and then held at 60–75° for 1.7 hours, during which time there was rapid refluxing in the water-cooled condenser. The temperature was then gradually raised to 162° C. over a period of 2.4 hours, and the volatile product exiting through the water-cooled condenser was collected in a solid carbon dioxide-acetone cooled trap. Distillation of the volatile material yielded 14 g., B.P. 5–7° C. (I), and 136 g., B.P. 7° to 12.5° C., chiefly from 10.5 to 12.5° C. (II). Infrared analysis showed that II was about 95%

$$SF_5N=CF_2$$

(difluoromethyleneamino)sulfur pentafluoride, and 5% $SF_5NCO$; fraction I was about 80% $SF_5N=CF_2$ with the remainder being chiefly $SF_5NCO$ and an isomer of $SF_5N=CF_2$, namely $SF_4=NCF_3$. These analysis indicate a 73% conversion to product, based on the $SF_5N=CCl_2$ used.

Careful redistillation of fraction II through a low temperature still yielded as the major fraction a product distilling at 10–12° C., which infrared analysis indicated was essentially pure $SF_5N=CF_2$, free of $SF_5NCO$. Pure $SF_5N=CF_2$ also has been obtained by gas chromatography using as the absorbent the ethyl ester of the acid obtained by telomerizing chlorotrifluoroethylene with methanol, followed by oxidation.

The $SF_5N=CXX'$ compounds of this invention can be readily converted to perfluoroalkylamine sulfur pentafluorides by reaction with hydrogen fluoride, and aqueous formic acid, as illustrated in Examples A through D.

Example A $$SF_5N=CCl_2 + 3HF \rightarrow SF_5NHCF_3 + 2HCl$$

A mixture of 23 g. of $SF_5N=CCl_2$ and 23 g. of hydrogen fluoride was heated at 70–80° C. for two hours, under autogenous pressure, and then stored over sodium fluoride at room temperature and autogenous pressure to remove hydrogen chloride and unreacted hydrogen fluoride. Distillation of the product yielded 14.7 g., amounting to a 68% conversion, of $SF_5NHCF_3$, (trifluoromethylamino)sulfur pentafluoride, B.P. 28.5° to 31° C., and 1.9 g., of a product with a B.P. 31.5° to 34° C. Mass spectrometric analysis showed a peak corresponding to the parent (211) and lower mass fragments which support the (trifluoromethylamino)sulfur pentafluoride structure. The infrared spectrum showed absorption at 2.88μ and 6.80μ (NH), at 8.38μ (C—F), and at 10.97μ and 11.34μ (SF₅). The F¹⁹ n-m-r spectrum indicated that an SF₅ and a CF₃ group were present.

*Analysis.*—Calcd. for CHF₈NS: F, 72.04; S, 15.17. Found: F, 71.78; S, 15.91.

A 2 g. sample of (trifluoromethylamino)sulfur pentafluoride, prepared as above, was placed in a test tube. To it was then added 0.1 g. of high molecular weight polyoxymethylene prepared as in U.S. Pat. No. 2,768,994. The mixture was stoppered and allowed to stand at room temperature overnight. When examined, it was found that the polyoxymethylene had completely dissolved.

Example B $$SF_5N=CClCF_3 + HF \rightarrow SF_5N=CFCF_3 + HCl$$
$$SF_5N=CClCF_3 + 2HF \rightarrow SF_5NHC_2F_5 + HCl$$

A mixture of 26 g. of $SF_5N=CClCF_3$ and 20 g. of hydrogen fluoride was heated at 100–150° C. for two hours under autogenous pressure and then stored over sodium fluoride at room temperature and autogenous pressure to remove hydrogen chloride and unreacted hydrogen fluoride. Distillation of the product through a spinning band column yielded the following fractions:

| Cut No. | B.P., ° C. | Wt. (g.) | Products¹ |
|---|---|---|---|
| 1 | 30–33.5 | 2.46 | 90% I; 10% II. |
| 2 | 33.5–41 | 4.18 | 50% I; 50% II. |
| 3 | 41–44 | 1.32 | 20% I; 80% II. |
| 4 | 44–45.5 | 1.57 | 5–10% I; 90% II. |
| 5 | 45.5–47 | 8.35 | 100% II. |

¹ Based on F¹⁹ n-m-r analyses.

Compound I was found to be $SF_5N=CFCF_3$, (tetrafluoroethylideneamino)sulfur pentafluoride, while II was $SF_5NHC_2F_5$, (pentafluoroethylamino)sulfur pentafluoride. The analysis, based on the F¹⁹ n-m-r, indicated a 50% conversion to $SF_5NHC_2F_5$ and a 19% conversion to $SF_5N=CFCF_3$.

Mass spectrometric analysis was satisfactory for $SF_5NHC_2F_5$ with the highest peak being the parent minus fluorine (242) and with other large peaks corresponding to the parent minus two fluorines and a hydrogen (222), to $SF_5$ (127), to $C_2F_5$ (119), to $CF_3$ (69), and to $SF_3$ (89). The F¹⁹ n-m-r spectrum was satisfactory, while the proton spectrum showed a single broad peak. The infrared spectrum showed absorption at 2.9 and 6.7μ (NH), in the 8–9μ (CF), and at 10.95 and 11.76μ (SF₅).

*Analysis.*—Calcd. for C₂HF₁₀NS: F, 72.80. Found: F, 70.82.

The infrared spectrum of compound $SF_5N=CFCF_3$, which comprised the major portion of Cut No. 1, showed absorption at 5.65μ (—CF=N—), in the 8–9μ region (CF), and at 10.9μ and 11.9μ (SF₅). The F¹⁹ n-m-r spectrum showed that after the peaks resulting from $$SF_5NHC_2F_5$$

were eliminated, there remained peaks corresponding to an SF₅ group, to a CF₃ group, and to a CF bond, and the peaks were present in the expected ratios.

Example C $$SF_5N=CClC_3F_7 + HF \rightarrow SF_5N=CFC_3F_7 + HCl$$
$$SF_5N=CFC_3F_7 + 2HF \rightarrow SF_5NHC_4F_9$$

A mixture of 26 g. of $SF_5N=CFC_3F_7$ and 11 g. of hydrogen fluoride was heated at 80–83° C. for 2.5 hours under autogenous pressure and then stored over sodium fluoride at room temperature and autogenous pressure for one hour to remove excess hydrogen fluoride. The product (27 g.) remaining attacked glass, so it was stored over 5 g. of fresh sodium fluoride pellets for an additional hour; 21 g. of liquid was decanted from the pellets. Infrared analysis showed the crude product to contain 60–70% $SF_5N=CFC_3F_7$, (octafluorobutylideneamino)sulfur pentafluoride, with the remainder being presumably $SF_5NHC_4F_9$, (nonafluorobutylamino)sulfur pentafluoride, since there was absorption at 2.9μ (NH) and at 6.75μ. Gas chromatographic analysis* showed the presence of two major products, one product had a retention time of 2.65 minutes while the second had a retention time of 7.65 minutes. Attempts to remove the amine from the column were unsuccessful, since both products when removed from the column were shown both by mass spectrometric and infrared analyses to be $SF_5N=CFC_3F_7$, (octafluorobutylideneamino)sulfur pentafluoride.

In another experiment, a mixture of 46 g. of $$SF_5N=CClC_3F_7$$

and 40 g. of hydrogen fluoride was heated at 150° C. for one hour, and at 200° C. for one hour, and autogenous pressure in a "Hastelloy" C pressure reactor. The crude product, after storage over sodium fluoride pellets at room temperature and autogenous pressure for 24 hours, yielded 36 g. of liquid product, distilling above 25° C. The F¹⁹ n-m-r spectrum showed the presence of two SF₅ groups, a peak corresponding to —N=|CF bond and additional CF peaks which probably resulted from the presence of a C₃F₇ and a C₄F₉ group. There was a single broad peak in the proton spectrum. By comparison with the F¹⁹ n-m-r spectrum of a known sample of $$SF_5N=CFC_3F_7$$

the crude product comprised about 30% $SF_5N=CFC_3F_7$, (octafluorobutylideneamino)sulfur pentafluoride, with the remainder being $SF_5NHC_4F_9$. Distillation of the crude product from sodium fluoride yielded 27 g. of pure $SF_5N=CFC_3F_7$, B.P. 72–73° C.

*Carried out on a 6′ x 0.25″ O.D. stainless steel column, packed with 20% by weight of a commercial silicone, sold as Silicone 200, supported on 40 to 60 mesh acid washed fire brick. The column was operated at 24° C. with helium flowing at 60 cc./minute, measured at the exit.

Reaction of (perfluoromethylamino)sulfur pentafluoride with silver (II) fluoride provides bis(trifluoromethyl)hydrazo-bis(sulfur pentafluoride) as shown in Example D, below.

Example D $$2SF_5NHCF_3 + 2AgF_2 \rightarrow (SF_5)CF_3NNCF_3(SF_5) + 2AgF + 2HF$$

A mixture of 21 g. of $SF_5NHCF_3$ and 50 g. of silver (II) fluoride was heated at 50° C. for one hour, 75° C. for one hour, and 100° C. for one hour and autogenous pressure in a 200 ml. stainless steel pressure reactor. The 21 g. of liquid recovered was distilled to give 2.72 g. of foreshot which infrared showed was chiefly product, B.P. 63–101° C., and 15 g. (amounting to a 72% conversion) of $(SF_5)CF_3NNCF_3(SF_5)$, bis(trifluoromethyl)hydrazo-bis(sulfur pentafluoride), B.P. 101–104° C., but chiefly at 103–104° C. The $F^{19}$ n-m-r spectrum for the compound was satisfactory showing the presence of an $SF_5$ and $CF_3$ group. The highest peak showed a mass spectrum which corresponded to the parent minus $SF_5$ (293), with lower peaks at 274 and 255, corresponding to additional losses of one and two fluorine atoms. The most abundant peaks in the spectrum corresponded to those for $SF_5$ (127) and the $CF_3$ (69) groups. The infrared spectrum showed absorption at 7.95μ, 8.40μ, and 8.60μ (CF) and broad absorption in the 10.7μ to 12.0μ region ($SF_5$).

*Analysis.*—Calcd. for $C_2F_{18}N_2S_2$: F, 72.38; S. 15.24. Found: F, 71.81; S, 15.44.

A test portion of the product was uneffected by boiling with 10% NaOH solution one to two minutes.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula $$SF_5 - N = CXX'$$

wherein X is a halogen of atomic number 9–17 and X' is selected from the group consisting of halogen of atomic number 9–17, hydrogen-free polyfluoroalkyl of up to 19 carbons, aryl, chloroaryl, and nitroaryl of up to 14 carbons, $SF_5N=CCl$ and $SF_5N=CF-$.

2. (Dichloromethyleneamino)sulfur pentafluoride, $SF_5N=CCl_2$.

3. (1-chlorotrifluoroethylideneamino)sulfur pentafluoride, $SF_5N=CClCF_3$.

4. (1-chloroheptafluorobutylideneamino)sulfur pentafluoride, $SF_5N=CClC_3F_7$.

5. N,N' - (dichloroethanediylidene)bis(aminosulfur pentafluoride), $SF_5N=CCl-CCl=NSF_5$.

6. (Phenylchloromethyleneamino)sulfur pentafluoride, $SF_5N=CClC_6H_5$.

7. (Difluoromethyleneamino)sulfur pentafluoride, $SF_5N=CF_2$.

8. (Trifluoromethylamino)sulfur pentafluoride.

9. The process of preparing a compound having the $SF_5-N=$ group which comprises reacting, under the influence of ultraviolet light, a mixture of $SF_5Cl$ and a member of the group consisting of cyanogen, cyanogen halides and carbonitriles free of aliphatic hydrogen and carbon-carbon unsaturation and having the formula ACN wherein A is selected from the group consisting of polyfluoroalkyl of up to 19 carbons and aryl, chloroaryl and nitroaryl of up to 14 carbons.

10. The process of preparing $SF_5N=CCl_2$ which comprises reacting, under the influence of ultraviolet light, a mixture of $SF_5Cl$ and cyanogen chloride.

11. The process of preparing $SF_5N=CClCF_3$ which comprises reacting, under the influence of ultraviolet light, a mixture of $SF_5Cl$ and trifluoroacetonitrile.

12. The process of preparing $SF_5N=CClC_3F_7$ which comprises reacting, under the influence of ultraviolet light, a mixture of $SF_5Cl$ and perfluorobutyronitrile.

13. The process of preparing $SF_5N=CCl-CCl=NSF_5$ which comprises reacting, under the influence of ultraviolet light, a mixture of $SF_5Cl$ and cyanogen.

14. The process of preparing $SF_5N=CClC_6H_5$ which comprises reacting, under the influence of ultraviolet light, a mixture of $SF_5Cl$ and benzonitrile.

15. The process of replacing with fluorine the chlorine in a member of the group consisting of $SF_5N=CCl_2$, $SF_5N=CCl-CCl=NSF_5$ and $SF_5N=CClR_f$, $R_f$ being hydrogen-free polyfluoroalkyl of up to 19 carbons, which comprises reacting the same with an alkali metal fluoride at a temperature in the range of about 50–200° C. in an inert liquid reaction medium.

16. The process of preparing $SF_5N=CF_2$ which comprises reacting $SF_5N=CCl_2$ with an alkali metal fluoride at a temperature in the range 50–200° C. and in a liquid reaction medium.

17. The process of preparing $SF_5N=CF_2$ which comprises reacting $SF_5N=CCl_2$ with sodium fluoride at a temperature in the range 50–200° C. and in a liquid reaction medium.

References Cited by the Examiner

UNITED STATES PATENTS

| | | | |
|---|---|---|---|
| 2,862,029 | 11/1958 | Smith | 260—543 |
| 2,883,422 | 4/1959 | Tullock | 260—543 |
| 3,053,789 | 9/1962 | De Witt | 260—30.8 |
| 3,053,790 | 9/1962 | Lewis et al. | 260—30.8 |

OTHER REFERENCES

Halpern et al., Applied Spectroscopy, vol. 11, 1957, page 174.

Smith et al., J. Am. Chem. Soc., vol. 82, February 1960, pp. 551–555.

LORRAINE A. WEINBERGER, *Primary Examiner.*

LEON ZITVER, *Examiner.*